United States Patent [19]
Brown

[11] Patent Number: 5,906,341
[45] Date of Patent: May 25, 1999

[54] PIPE SUPPORTING DEVICE

[76] Inventor: James M. Brown, 4015 Rufe Snow Dr., Fort Worth, Tex. 76180

[21] Appl. No.: 08/853,435

[22] Filed: May 9, 1997

Related U.S. Application Data

[63] Continuation-in-part of application No. 08/583,137, Dec. 28, 1995, abandoned.

[51] Int. Cl.[6] .................................................. F16L 3/00
[52] U.S. Cl. ................................ 248/49; 248/49; 248/70; 248/74.3; 248/68.1
[58] Field of Search ................................ 248/49, 65, 70, 248/74.3, 909, 159, 68.1, 69, 73; 285/61, 64; 403/200, 217; 52/126.4, 126.7, 678

[56] References Cited

U.S. PATENT DOCUMENTS

| | | | |
|---|---|---|---|
| 180,806 | 8/1876 | Striegel | 248/397 |
| 330,546 | 11/1885 | Barlow | 248/237 |
| 1,075,281 | 10/1913 | Anderson | 285/334.5 |
| 1,543,531 | 6/1925 | Steisel | 248/154 |
| 1,770,852 | 7/1930 | Hill | 285/289.1 |
| 1,782,017 | 11/1930 | Shanks | 403/200 |
| 2,007,496 | 7/1935 | Hurlbut | 248/27.8 |
| 2,322,753 | 6/1943 | Thomas | 604/83 |
| 2,513,461 | 7/1950 | Duncan, Jr. | 248/156 X |
| 2,750,139 | 6/1956 | Young | 248/148 |
| 3,017,152 | 1/1962 | Alpaugh | 248/148 |
| 4,235,259 | 11/1980 | Hudock | 138/97 |
| 4,450,935 | 5/1984 | Gustavus | 248/237 X |
| 4,576,352 | 3/1986 | Ogden | 248/188.4 |
| 4,610,432 | 9/1986 | Lewis et al. | 256/65 |
| 4,695,023 | 9/1987 | McCafferty | 248/237 X |
| 4,790,500 | 12/1988 | Mori | 248/49 |
| 4,917,345 | 4/1990 | Czech | 248/237 X |
| 5,411,232 | 5/1995 | Hufford | 248/231.3 |

*Primary Examiner*—Leslie A. Braun
*Assistant Examiner*—Gwendolyn Baxter
*Attorney, Agent, or Firm*—Charles D. Gunter, Jr.

[57] ABSTRACT

A pipe supporting device is shown of the type used to support an exposed pipe of a roof. The device includes a base having a flat bottom for resting on the roof, an upright member of a length which is connectable to the base and a receiving portion which is connectable to the upright member for receiving and supporting the exposed pipe. The length of the upright member can be altered by a user at a job site to thereby provide a device having a desired overall height.

15 Claims, 4 Drawing Sheets

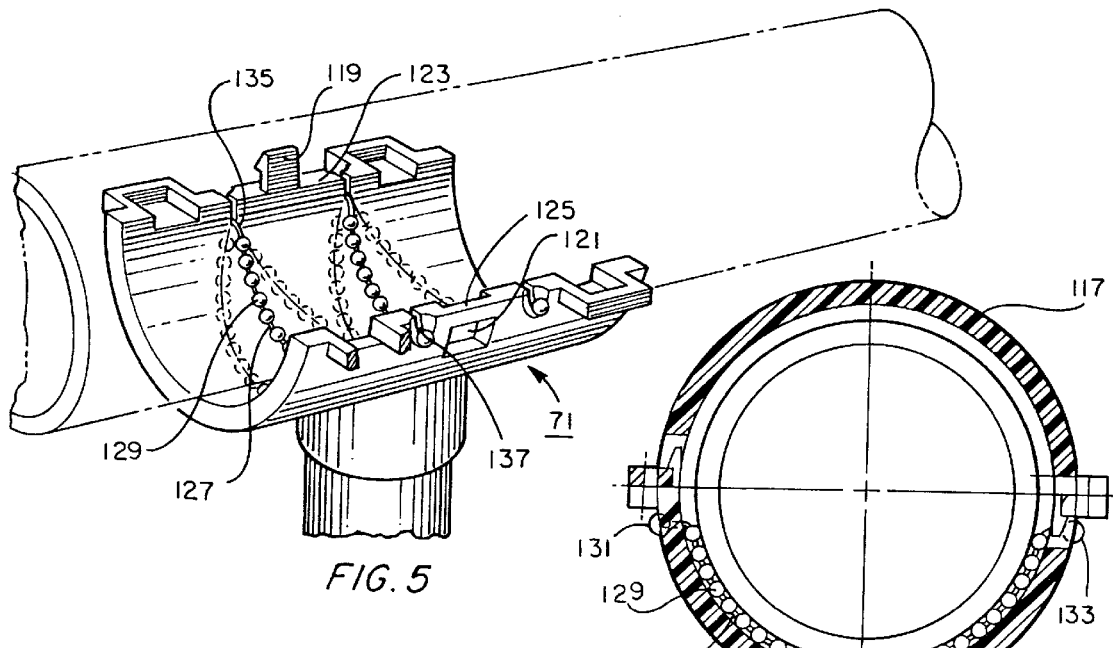
FIG. 5
FIG. 6
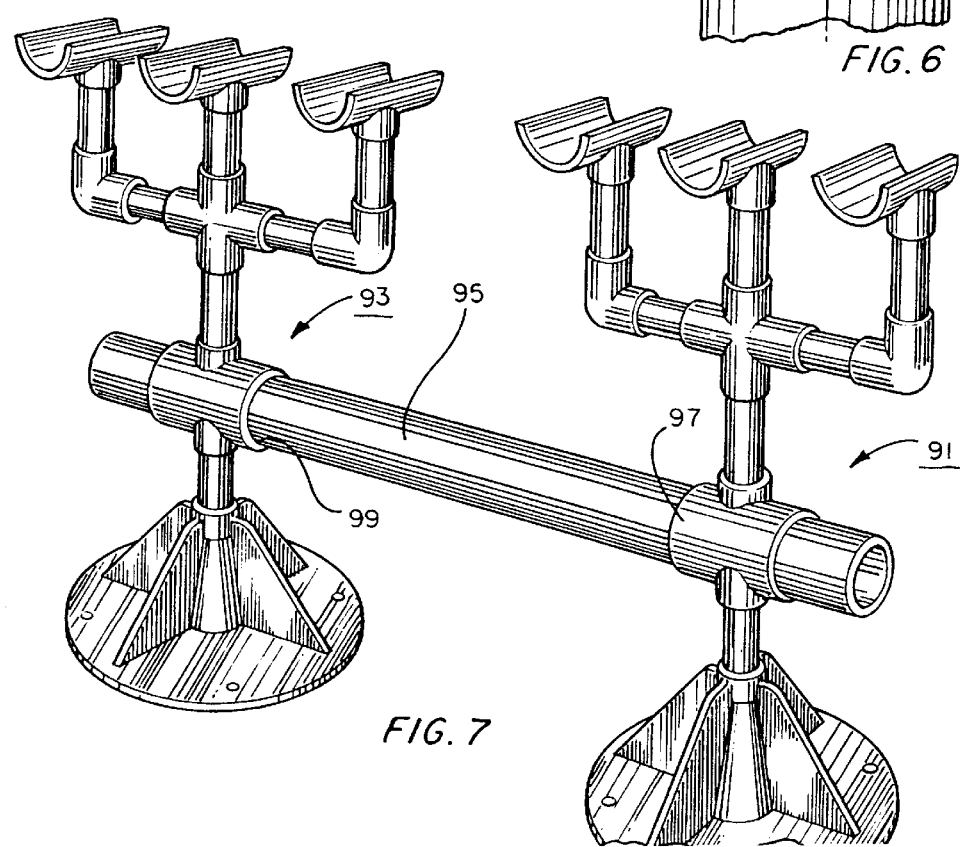
FIG. 7

PIPE SUPPORTING DEVICE

Cross-Reference to Related Applications

The present application is a continuation-in-part of earlier filed pending application, Ser. No. 08/583,137, filed Dec. 28, 1995, by the same inventor now abandoned.

BACKGROUND OF THE INVENTION

1. Field of the Invention

The present invention relates generally to improvements in support arrangements for exposed pipes and, more specifically, to a support device for an exposed pipe on a building roof.

2. Description of the Prior Art

A variety of devices have been used in the prior art in order to support exposed pipe. Support devices are necessary for a number of reasons, such as to prevent undue strain being placed upon a pipe or coupling. In some cases, it is necessary to support the pipe at a slope with respect to an adjacent support area, such as in the case of condensate drain lines from air conditioning/heating systems, or in the case of sewer pipes and lines.

Commercial buildings often have various types of pipes which are exposed and run along the rooftops of such buildings. For example, it is quite common for air conditioning units to be mounted on a building roof of a commercial building, the air conditioning units having condensate drain pipes which slope from the unit toward an exit point on the rooftop. Other service units are commonly mounted on building roofs which utilize pipes which must be supported, often at a slope with respect to the surrounding rooftop.

At the present time, most mechanical and heating/ventilation contractors hand saw pieces of wood of the desired height to support air conditioner condensate drain pipes. This procedure is time consuming and labor intensive. An adjustable, ready-made device would save time and money.

While various devices are shown in the prior art for supporting pipes, shortcomings continue to exist. For example, U.S. Pat. No. 4,513,934, to Pruyne, issued Apr. 30, 1985, shows a pipe supporting device adapted to receive and support an exposed pipe on a building roof. The device has a base with a substantially flat bottom for resting on the roof and an upwardly tapered structure secured on and rising from the base to provide upwardly divergent, V-shaped recesses for receiving the pipe and supporting it above the base. One problem with the device shown in the '934 patent is that the upright portion of the device is not adjustable in length. As a result, it is not possible to vary the overall height of the device except by stacking multiple devices, one upon the other, thereby adding to the cost of the installation. Of course individual devices of the type shown in the '934 patent could be manufactured of different overall heights, however this would lead to additional expense in manufacture and require that the user maintain an inventory of different height devices in order to provide the slope required at the particular job site.

The present invention has as its object to provide a pipe supporting device which is simple in design and economical to manufacture and which can support an exposed pipe at a desired slope with respect to a surrounding support surface, such as a building roof.

Another object of the invention is to provide such a pipe supporting device which has an upright member which is easily adjustable in length in order to provide a pipe supporting device of a selected overall height at the job site.

Another object of the invention is to provide such a pipe supporting device of standard components which can be mass produced at an economical price but which include height adjustment features to allow the standard device to be adjusted an overall height to fit the installation location at hand.

SUMMARY OF THE INVENTION

The pipe supporting device of the invention is adapted to receive and support an exposed pipe, as on the rooftop of a building. The device includes a base having a flat bottom for resting on an associated support surface, such as the roof. An upright member of a first selected length is connectable to the base. A receiving portion, connectable to the upright member receives and supports the exposed pipe. The first selected length of the upright member can be altered by a user at the job site to thereby provide a device having a desired overall height for supporting an exposed pipe.

A pipe supporting device is also shown which is adapted to receive and support an exposed condensate drain pipe from an air conditioning unit located on a rooftop. The device includes a base having a flat bottom for resting on the roof and having an upwardly extending receptacle portion. An upright member of a first selected length has a first extent which is insertable within the upwardly extending receptacle portion of the base. A saddle shaped receiving portion is also provided for receiving and supporting the exposed pipe. The saddle shaped receiving portion has a downwardly extending receptacle portion for receiving an opposite extent of the upright member. The first selected length of the upright member can be altered by a user at a job site to thereby provide a device having a desired overall height for supporting an exposed pipe at the desired height on a roof. Preferably, the upright member is a length of PVC pipe which has graduations provided along the length thereof. The first selected length of the upright member is altered by severing the length thereof at a selected graduation. Engagement means can also be provided which are connectable with the saddle shaped receiving portion for engaging and securing a portion of a pipe which is received and supported within the saddle shaped receiving portion.

A plurality of saddle shaped receiving portions can be provided for receiving and supporting exposed pipe with the saddle shaped receiving portions all being supported about a common juncture giving the device the appearance of a candelabra. In one embodiment of the invention, the plurality of saddle shaped receiving portions are arranged at varying angles and heights relative to the base.

In another embodiment of the invention, the first upright member engages a coupling member which includes an upper receptacle portion for receiving an additional upright member in press-fit fashion, the coupling member having a horizontal opening therein for receiving a horizontally oriented stabilizing conduit, whereby a pair of pipe supporting devices can be arranged in side-by-side fashion with the devices being interconnected by a horizontally oriented stabilizing conduit which passes through aligned horizontal openings in the coupling members of the respective pair of pipe supporting devices.

The saddle shaped receiving portion can also be provided with a roller support system for supporting an exposed pipe thereon, whereby the exposed pipe is provided with a degree of lateral movement within the saddle shaped receiving portion without exerting stress on the base thereof.

Preferably, the roller system comprises a roller ball race and a plurality of roller balls therein, arranged at one radial location in the saddle shaped receiving portion of the device.

Additional objects, features and advantages will be apparent in the written description which follows.

BRIEF DESCRIPTION OF THE DRAWINGS

FIG. 5 is an isolated view of the saddle shaped receiving portion of the device shown equipped with a roller support system, the supported pipe being shown in phantom lines;

FIG. 6 is an end view of the saddle shaped receiving portion of FIG. 5;

FIG. 7 is a perspective view of another embodiment of the invention showing a pair of pipe support devices connected by coupling-members;

DETAILED DESCRIPTION OF THE INVENTION

A variety of situations exist in which it is desirable to support an exposed pipe by means of a pipe supporting device. One such common situation occurs in commercial buildings which commonly have a number of exposed pipes which are supported above the roof of the building.

Figure 1:
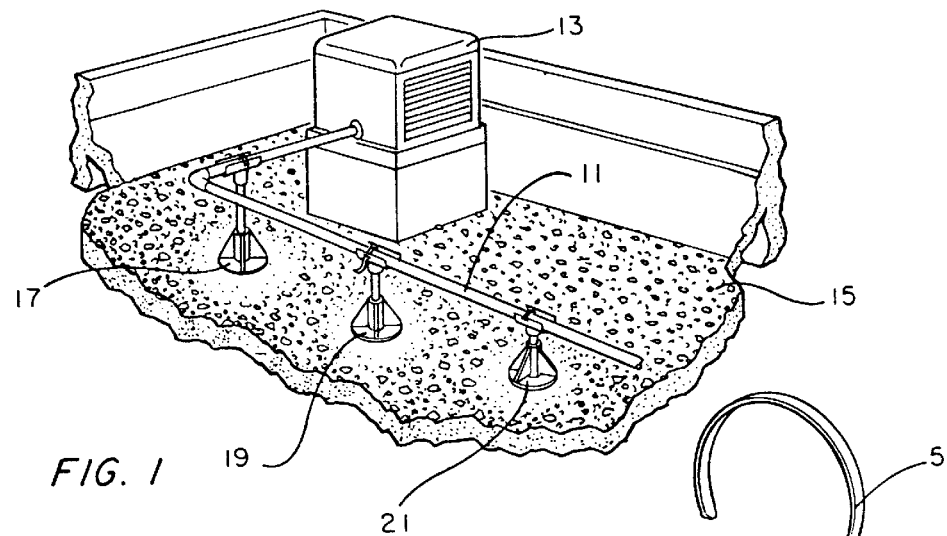
FIG. 1 is a perspective view, partly broken away, showing an air conditioning unit on a building roof, the unit having a condensate drain pipe which is supported by the pipe supporting devices of the invention.

FIG. 1 shows a typical installation in which a pipe 11 from an air conditioning unit 13, mounted on a roof 15, extends across the roof to a desired location (not shown) where it exits over the side of the roof, through the roof, or is connected to other roof-mounted equipment.

The pipe supporting devices 17 of the invention are positioned on the roof 15 to support the pipe 11 as it extends along the roof. The number of supporting devices needed will depend upon the type of the pipe supported, its size, weight, overall dimensions, and the material from which it is made, as well as the particular layout employed on the roof. In general, for air conditioning systems of the type shown, it will be desirable to support the pipe with a gradual slope from the air conditioning unit in the direction of the point at which the pipe extends over the side of the roof or otherwise exits the rooftop. Thus, in the embodiment of the invention shown in FIG. 1, the overall height of the pipe supporting device 17 is greater than that of pipe supporting device 19 which, in turn, is greater than the overall height of pipe supporting device 21.

Figure 3:
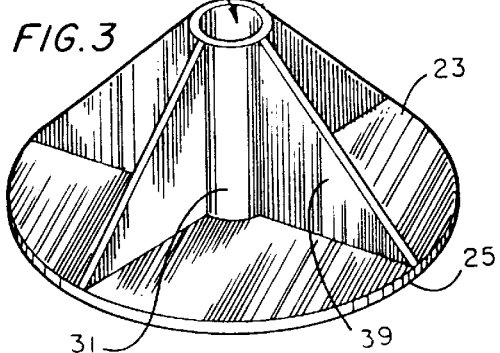
FIG. 3 is an isolated, exploded view of the pipe supporting device of the invention showing the component parts thereof.

As best seen in FIG. 3, the pipe supporting device of the invention includes a base 23 having a generally round and flat bottom 25 for resting on the roof 15. An upright member 27 of a first selected length ("1" in FIG. 3) is connectable to the base 23.

A receiving portion designated generally as 29 in FIG. 3, is connectable to the upright member 27 and is adapted to receive and support the exposed pipe 11.

As shown in FIG. 3, the base 23 preferably includes an upwardly extending connector portion 31, which in this case is an upright cylindrical member having an end opening 33. The upwardly extending connector portion 31 has an initially open, generally uniform interior 35 for receiving a first extent 37 of the upright member 27. A plurality of gussets 39 are arranged on the base bottom 25. Each gusset comprises a triangular reinforcing brace for reinforcing the upwardly extending connector portion 31. In the preferred embodiment shown, there are four gussets 39 arranged at equiangular positions about the upwardly extending connector portion 31 on the base bottom 35. The base 23, as well as the receiving portion 29, can be conveniently injection molded of a suitable plastic material, such as polyvinylchloride plastic (PVC) or a suitable polyolefin material.

The upright member 27 is conveniently provided as a length of PVC pipe which is commercially available from a number of sources. The upright member 27 shown in FIGS. 2 and 3 is ¾ inch I.D. where the pipe supporting device is intended to support the condensate drain pipe of an air conditioning unit mounted on a roof.

The saddle shaped receiving portion 29 has a downwardly extending connector portion 41 which is connectable with the opposite extent 43 of the upright member 27 to complete the assembly. As shown in FIG. 3, the downwardly extending connector portion is a cylindrical member having an end opening 45 which is similar to end opening 33 in the base 23 for receiving and securely engaging the upright member 27. The receiving portion 29 also has a concave receiving recess 47 for receiving the pipe 11 to be supported. The concave recess 47 is available in sizes ranging from about ½ inch I.D. to a maximum of 1½ inch I.D. for supporting the drain pipes of air conditioning units. An engagement means, such as the tie wrap 53 is connectable with the saddle shaped receiving portion 29, as by a slot, 51, provided therein, whereby a pipe which is received and supported within the receiving recess 47 can be securely engaged within the receiving portion. The tie wrap passes about the exterior of the pipe and saddle shaped receiving portion and is held in place by the slot 51 shown in FIG. 3.

The first selected length of the upright member 27 can be altered by a user at the job site to thereby provide a pipe supporting device having a desired overall height for supporting the exposed pipe 11 at a desired height on the roof. Preferably, the upright member 27 is provided with graduations 55 along the length thereof and is alterable by severing the length thereof at a selected graduation. In the case of a PVC pipe, this can be conveniently accomplished by sawing the member with a saw, cutting the member with a cutting tool or by breaking the member at a frangible region provided therein. By whatever means, it is only necessary that the user be able to alter the overall length of the upright member 27 at the job site in order to provide a pipe supporting device of a desired overall height to fit the intended location of use. In the case of the air conditioner 13 shown in FIG. 1, the condensate drain line 11 is provided with a gradual downward slope as it exits the air conditioner by supplying pipe supporting devices of gradually diminishing height so that condensate easily drains from the air conditioner to a drain point on the roof.

Figure 2:
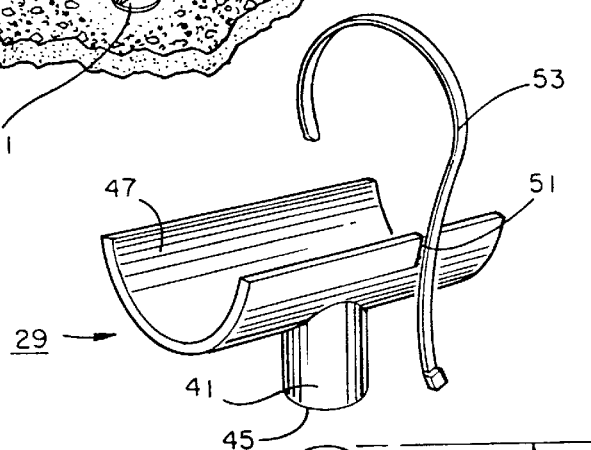
FIG. 2 is an isolated, close-up perspective view of one of the pipe supporting devices of FIG. 1 showing a pipe being supported thereby, the pipe being shown in phantom lines.
Figure 2:
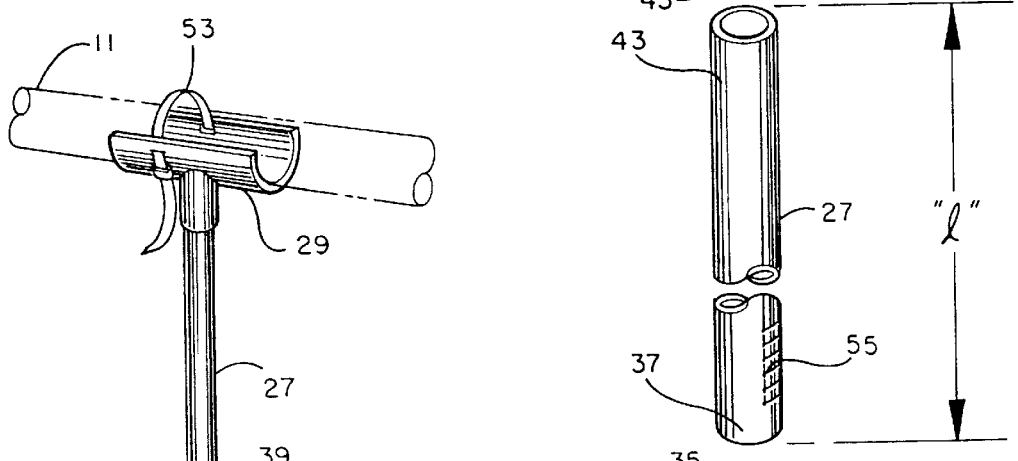
Figure 2:
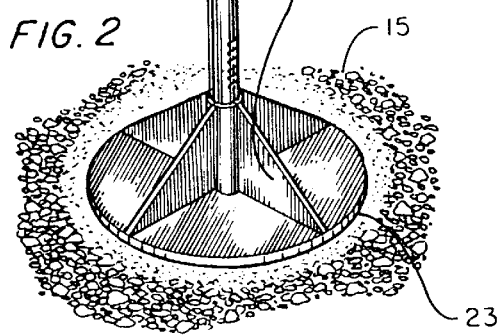

FIG. 2 is a close-up view of the first pipe supporting device 17 shown on the rooftop 15, the overall length of the upright member 27 being greater than the overall length of the upright member provided for devices 19 and 21.

In use, the pipe supporting devices of the invention are installed beneath the pipe to be supported at spaced intervals along the pipe. The flat bottom portion of the base rests upon the associated support structure to provide stability for the device and ensure the firm engagement of the pipe to be supported. The bottom of the device can be cemented to the rooftop or nailed in place in some situations. The overall height which is desired is determined and the upright member 27 is altered to the desired dimensions by severing the upright member at the appropriate graduation 55. The upright member is then installed within the receptacles of the respective connector portions 31, 41 and the pipe is received within the recess 47 of the receiving portion 29. The pipe can be secured in place with a tie wrap 53 which is passed about the pipe exterior and secured after being passed through the openings 49, 51.

Figure 4:
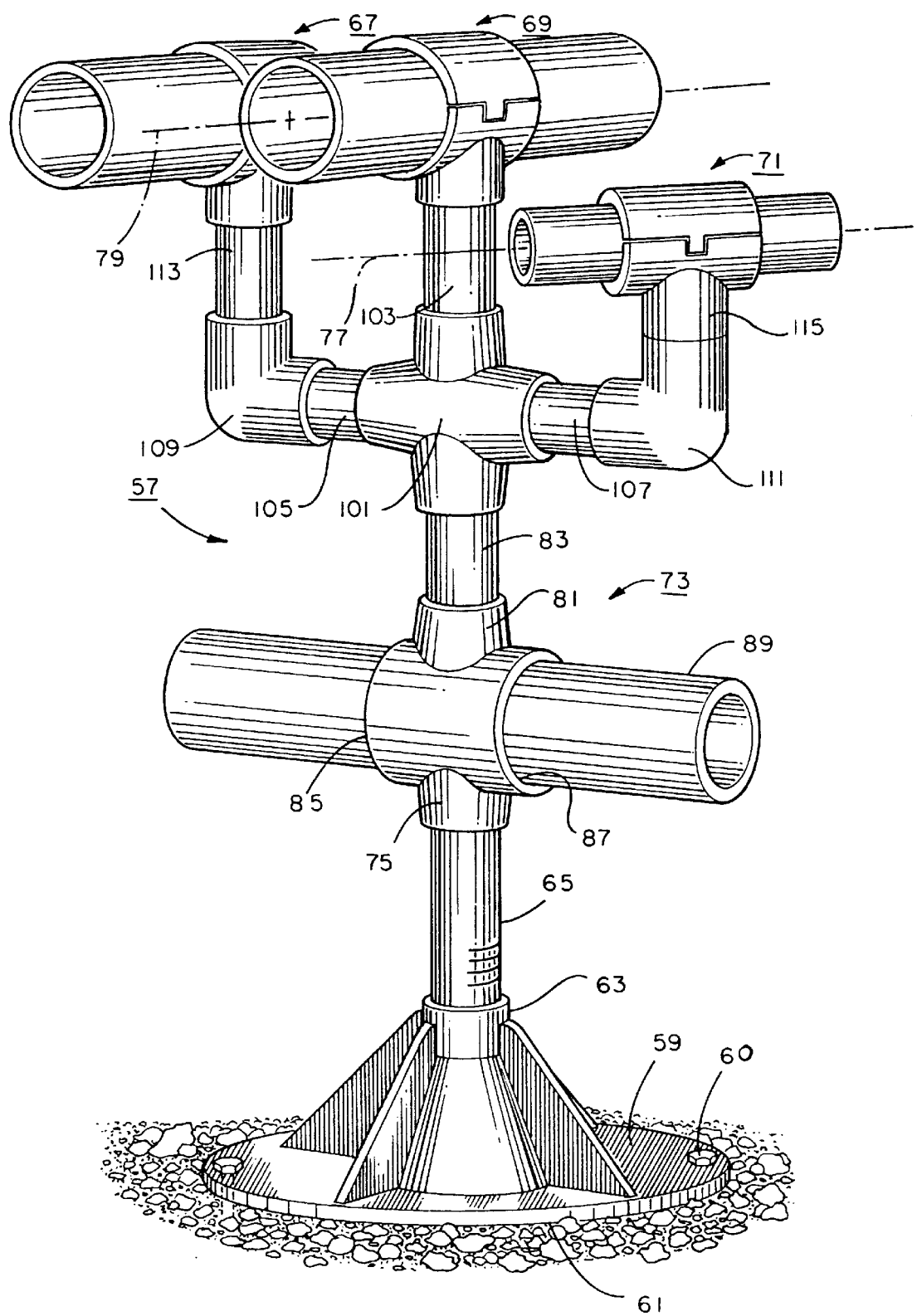
FIG. 4 is a perspective view of another embodiment of the invention showing the candelabrum configuration of the device.

FIG. 4 shows another embodiment of the pipe supporting device of the invention designated generally as 57. The pipe supporting device 57 again includes a base 59 having a flat bottom 61 for resting on a surrounding roof and having an upwardly extending receptacle portion 63<As shown in FIG. 4, the base 59 may be secured to the rooftop by means of anchor screws 60 and/or may have an adhesive compound, such as a suitable glue, applied to the bottom surface 61 thereof.

A first upright member 65 formed of a synthetic plastic material has a first extent which is insertable within the upwardly extending receptacle portion 63 of the base to engage the base receptacle portion in press-fit fashion. In this case, however, a plurality of saddle shaped receiving portions 67, 69, 71 are all supported about a common juncture or coupling 73 having a downwardly extending receptacle portion 75 for receiving an opposite extent of the first upright member 65 and engaging the first upright member in press-fit fashion. As before, the first selected length 65 of the first upright member can be altered by a user at a job site to provide a device having the desired overall height.

Preferably, the plurality of saddle shaped receiving portions 67, 69, 71 which are provided for receiving and supporting the exposed pipe are arranged at varying angles and heights relative to the base 59. Thus, in FIG. 4, imaginary axis 77 of receptacle portion 71 is at a different height and a different angle than imaginary axis 79 of receptacle portion 69. The overall effect of the plurality of saddle shaped receiving portions 67, 69, 71 is to provide a pipe supporting device having a candelabra configuration.

In the embodiment of FIG. 4, the coupling member 73 includes an upper receptacle portion 81 for receiving an additional upright member 83 in press-fit fashion. The coupling member 73 also has horizontal openings 85, 87 for receiving a horizontally oriented stabilizing conduit 89, whereby a pair of pipe supporting devices (91, 93 in FIG. 7) can be arranged in side-by-side fashion with the devices being interconnected by a horizontally oriented stabilizing conduit 95 which passes through aligned horizontal openings 97, 99 in the coupling members of the respective pair of pipe supporting devices. Preferably, at least the first upright members (65 in FIG. 4) has graduations provided along the length thereof, whereby the first selected length of the first upright member 65 can be altered by severing the length thereof at a selected graduation.

In the embodiment of the invention illustrated in FIG. 4, the additional or second upright member 83 extends upwardly from the coupling member 73, coaxially with the first upright member 65. The second upright member 83 engages a T-fitting 101. A third upright member 103 extends upwardly from the T-fitting co-axially with the second upright member 83. A pair of horizontal conduit branches 105, 107 extend in a horizontal plane from the T-fitting on opposite sides thereof generally normal to the plane of the upright member 65, 83. The horizontal conduit branches 105, 107 are connected to elbow fittings 109, 111, respectively, which support additional upright members 113, 115.

As previously explained with respect to the tie wrap 53 shown in FIG. 3, engagement means are preferably provided which are connectable with the saddle shaped receiving portions of the device for engaging an securing a portion of a pipe which is received and supported within the saddle shaped receiving portions. FIG. 6 is a cross-sectional view of a saddle shaped receiving portion 71 which, in this case, has a mating cover piece 117 which completes the engagement means of the device. The cover piece 117 and saddle shaped receiving portion 71 together comprise a hollow cylindrical member for receiving and supporting an exposed pipe. In the embodiment of FIGS. 5 and 6, the opposite sides of the saddle shaped receiving portion 71 are provided with mating tabs 119 and recesses 121 whereby the cover piece 117 engages the saddle shape receiving portion 71 in snap-engagement fashion. If desired, adhesive can be applied along the exposed lips 123, 125 of the mating pieces to further secure the assembly.

In the embodiment of FIGS. 5 and 6, the saddle shaped receiving portions are also provided with a roller support system for supporting an exposed pipe thereon, whereby the exposed pipe is provided with a degree of lateral movement within the saddle shaped receiving portion 71 without exerting stress on the base 59 thereof. As shown in FIG. 5, the roller support system can comprise a wire support 127 and a plurality of roller balls 129 carried thereon, the roller support system being arranged at one radial location in the saddle shaped receiving portion of the device. Preferably, the roller system comprises a plurality of wires and associated roller balls strung thereon, the wire supports being arranged at a plurality of longitudinally aligned radial locations in the saddle shaped receiving portion 71. In the embodiment illustrated, each of the wire supports 127 carrying a plurality of balls thereon has terminating extents 131, 133 received within slots 135, 137 for retaining the wire supports at the selected longitudinally aligned radial locations. By using balls 129 strung on wire supports 127, a "trapeze" effect is achieved which allows the wire support 127 to swivel like a swing in addition to allowing the roller balls 129 to turn on their respective wires.

Figure 8:
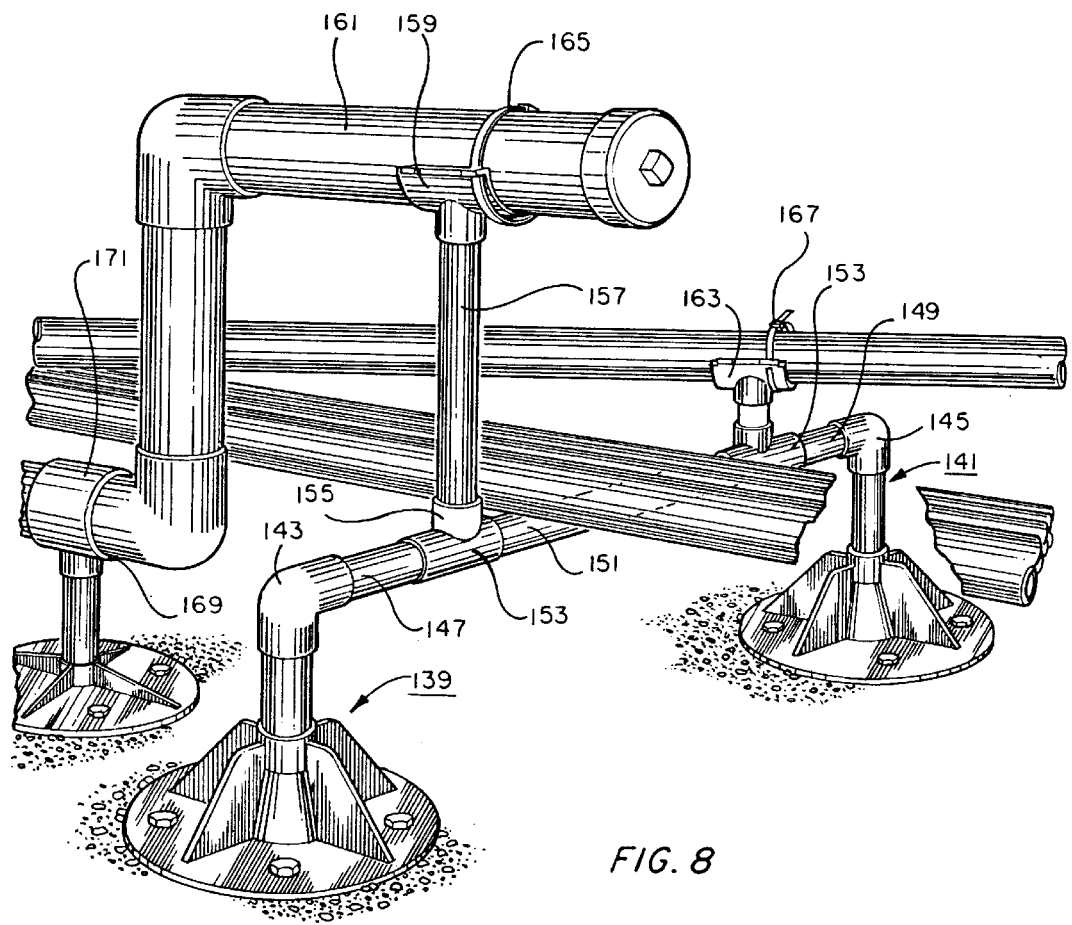
FIG. 8 is a perspective view of another embodiment of the invention showing the support devices fitted with elbow couplings and a horizontal support member.
Figure 9:
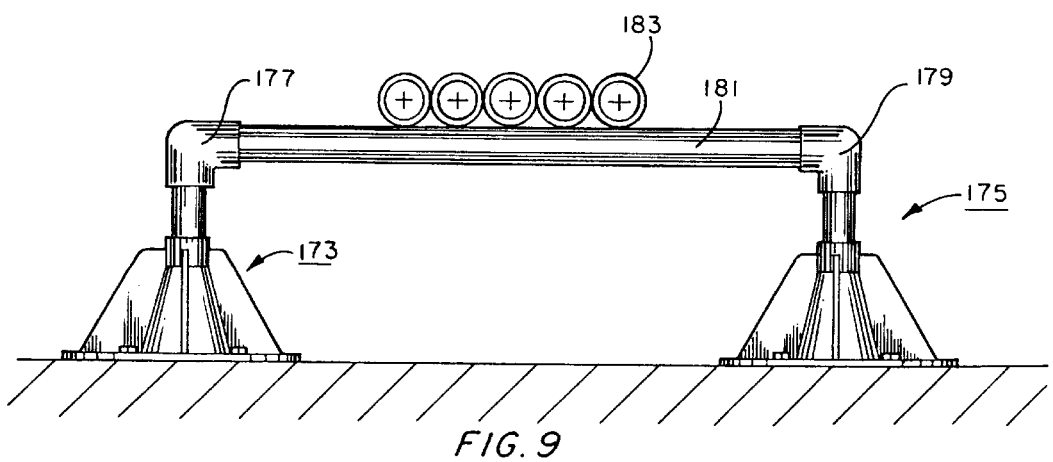
FIG. 9 is an end view similar to FIG. 8 showing a plurality of exposed pipes supported on the horizontal support member thereof.

FIGS. 8 and 9 illustrate another embodiment of the invention in which a pair of base and upright members 139, 141 are connected to elbow fittings 143, 145, the elbow fittings, in turn, having connecting ends which engage and support the opposite extents 147, 149 of a horizontal support member 151 therebetween. At least one T-coupling 153 is located within the horizontal support member 151. The T-coupling has an upwardly extending receptacle portion 155 for receiving a first extent of a further upright member 157. The further upright 157 engages a saddle shaped receiving portion 159 for supporting a conduit 161. Preferably, a plurality of T-couplings 153, 163 are provided for supporting saddle shaped receiving portions 159, 163 whereby a plurality of exposed pipes can be supported at varying heights and angles relative to the bases 139, 141. In the embodiment of FIG. 8, the saddle shaped receiving portions 159, 163 are provided with tie wraps 165, 167, while saddle shaped receiving portion 169 is provided with a snap-fit cover 171, as previously discussed.

FIG. 9 further illustrates the versatility of the pipe supporting device of the invention, illustrating a pair of spaced apart base members 173, 175 which, together with elbow fittings 177, 179 and horizontal support member 181 form a horizontal brace for the exposed pipes 183.

An invention has been provided with several advantages. The pipe supporting device of the invention is simple in design and economical to manufacture. If desired, each of the components of the device can be molded or extruded from PVC or other commercially available plastic materials. PVC is generally preferred because it resists deterioration from exposure to ultraviolet light, i.e., sunlight, is fire retardant, and has the requisite strength for most applications. The adjustable upright member of the pipe supporting device allows the overall height of the device to be adjusted for supporting an exposed pipe at any of a number of desired heights on a roof or other surrounding support structure. A series of graduations provides a convenient means for determining the overall length of the upright member. Since the upright member is comprised of commercially available PVC pipe, it can be easily cut or sawed to the desired length. This allows a standard sized pipe supporting device to be mass produced which can be altered in overall height to the requirements of a particular job while on the job site. The device is simple to install and saves time over prior art practices, such as cutting and assembling wooden boards to the required heights.

While the invention has been shown in only one of its forms, it is not thus limited but is susceptible to various changes and modifications without departing from the spirit thereof.

What is claimed is:

1. A pipe supporting device adapted to receive and support at least one exposed condensate drain pipe from an air conditioning unit located on a roof, the device comprising:

a base having a flat bottom for resting on the roof, the base having an upwardly extending receptacle portion;

a first upright member formed of a synthetic plastic material of a first selected length, the first upright member having a first extent which is insertable within the upwardly extending receptacle portion of the base to engage the base receptacle portion;

a saddle shaped receiving portion for receiving and supporting the exposed pipe, the saddle shaped receiving portion being supported about a common juncture having a downwardly extending receptacle portion for receiving an opposite extent of the first upright member and engaging the first upright member;

wherein the first selected length of the first upright member can be altered by a user at a job site to thereby provide a device having a desired overall height for supporting the exposed pipe at a desired height on the roof;

wherein a plurality of pipe supporting devices are usable to support the condensate drain pipe each with a saddle shaped receiving portion and wherein the plurality of saddle shaped receiving portions for receiving and supporting the exposed pipe are arranged at varying angles and heights relative to the base;

wherein the plurality of saddle shaped receiving portions for receiving and supporting the exposed pipe are arranged in a candelabra configuration; and wherein the first upright member engages a coupling member located intermediate the base and the common juncture of the saddle shaped receiving portion which includes an upper receptacle portion for receiving an additional upright member, the coupling member having a horizontal opening therein for receiving a horizontally oriented stabilizing conduit, whereby a pair of pipe supporting devices can be arranged in side-by-side fashion each device having a coupling member with the devices being interconnected by a horizontally oriented stabilizing conduit which passes through aligned horizontal openings in the coupling members of the respective pair of pipe supporting devices.

2. The pipe supporting device of claim 1, wherein at least the first upright member has graduations provided along the length thereof and wherein the first selected length of the first upright member is altered by severing the length thereof at a selected graduation.

3. The device of claim 2, wherein the first upright member is a length of PVC pipe.

4. The device of claim 3, further comprising:

engagement means connectable with the saddle shaped receiving portion for engaging and securing a portion of a pipe which is received and supported within the saddle shaped receiving portion.

5. The device of claim 4, wherein the engagement means is a flexible tie wrap and wherein at least one opening is provided in the saddle shaped receiving portion of the device for connecting the tie wrap.

6. The pipe supporting device of claim 5, wherein the device has the first upright member extending upwardly from the base thereof to the coupling member thereof, a second upright member extending upwardly from the coupling member and co-axial with the first upright member, the second upright member engaging a T-fitting, and wherein a third upright member extends upwardly from the T-fitting co-axial with the second upright member and a pair of horizontal conduit branches extend in a horizontal plane from the T-fitting on opposite sides thereof generally normal to the plane of the upright members, the horizontal conduit branches being connected to elbow fittings which support additional upright members.

7. The pipe supporting device of claim 6, wherein the elbow fittings and additional upright members which are connected to the horizontal conduit branches of the device are connected to the saddle shaped receiving portions for supporting the exposed pipe.

8. The pipe supporting device of claim 7, wherein the saddle shaped receiving portions are located at different heights relative to the base thereof.

9. A pipe supporting device adapted to receive and support an exposed pipe, the device comprising:

an injection molded, plastic base having a flat bottom for resting on an adjacent support surface, the base having an upwardly extending receptacle portion and a plurality of outwardly extending gussets which join the base and upwardly extending receptacle portion;

a first upright member formed from a first selected length of hollow PVC pipe, the first upright member having a first extent which is insertable within the upwardly extending receptacle portion of the base to engage the base receptacle portion;

an injection molded, plastic saddle shaped receiving portion for receiving and supporting the exposed pipe, the saddle shaped receiving portion having a concave receiving recess for receiving the pipe and a downwardly extending receptacle portion for receiving an opposite extent of the first upright member and engaging the first upright member;

engagement means connectable with the saddle shaped receiving portion for engaging and securing a portion of a pipe which is received and supported within the receiving recess of the saddle shaped receiving portion;

wherein the first selected length of the first upright member can be altered by a user at a job site to thereby provide the device having a desired overall height for supporting the exposed pipe at a desired height; and wherein the saddle shaped receiving portion is provided with a roller support system for supporting an exposed pipe thereon, whereby the exposed pipe is provided with a degree of lateral movement within the saddle shaped receiving portion without exerting stress on the base thereof.

10. The pipe supporting device of claim 9, wherein the roller system comprises a roller ball race and a plurality of roller balls therein, arranged at one radial location in the saddle shaped receiving portion of the device.

11. The pipe supporting device of claim 10, wherein the roller system comprises a plurality of roller ball races arranged at a plurality of longitudinally aligned radial locations in the saddle shaped receiving portion.

12. A pipe supporting device adapted to receive and support an exposed condensate drain pipe from an air conditioning unit located on a roof, the device comprising:

a base having a flat bottom for resting on the roof, the base having an upwardly extending receptacle portion;

a first upright member of a first selected length, the first upright member having a first extent which is insertable within the upwardly extending receptacle portion of the base;

a saddle shaped receiving portion for receiving and supporting the exposed pipe, the saddle shaped receiving portion having a downwardly extending receptacle portion for receiving an opposite extent of the first upright member;

wherein the first selected length of the first upright member can be altered by a user at a job site to thereby provide the device having a desired overall height for supporting the exposed pipe at the desired height on the roof;

wherein a pair of base and upright members are connected to elbow fittings, the elbow fittings, in turn, having connecting ends which engage and support the opposite extents of a horizontal support member therebetween;

wherein at least one T-coupling is located within the horizontal support member, the T-coupling having an upwardly extending receptacle portion for receiving a first extent of a further upright member; and a saddle shaped receiving portion for receiving and supporting the exposed pipe, the saddle shaped receiving portion having a downwardly extending receptacle portion for receiving an opposite extent of the further upright member.

13. The pipe supporting device of claim 12, wherein the horizontal support member has a pair of spaced apart T-couplings located therein, each T-coupling having a saddle shaped receiving portion for receiving and supporting exposed pipe at spaced apart locations along the horizontal support member.

14. The pipe supporting device of claim 13, wherein the saddle shaped receiving portions of the spaced apart T-couplings are positioned at different respective heights, whereby the exposed pipes are supported at different heights relative to the horizontal support member.

15. The pipe supporting device of claim 14, wherein the exposed pipes are supported at different angular orientations with respect to the horizontal support member.

\* \* \* \* \*